United States Patent
Smith

[11] 3,716,975
[45] Feb. 20, 1973

[54] SAFETY SHIELD FOR POWERED LAWN EQUIPMENT

[76] Inventor: Alfred E. Smith, 3938 Lorado Way, Los Angeles, Calif. 90043

[22] Filed: Jan. 20, 1972

[21] Appl. No.: 219,320

[52] U.S. Cl. .................56/17.4, 56/256, 296/78.1
[51] Int. Cl. ..........................................A01g 3/06
[58] Field of Search ............296/136, 78.1; 180/19; 280/47.17–47.41; 56/255, 256, 16.7–17.6

[56] References Cited

UNITED STATES PATENTS

| | | | |
|---|---|---|---|
| 1,387,349 | 8/1921 | Campbell | 296/78.1 |
| 2,791,875 | 5/1951 | Faas | 56/17.4 |
| 2,553,463 | 5/1951 | McCulloch | 56/15.6 X |
| 3,406,761 | 10/1968 | Ryan | 172/42 |
| 3,154,342 | 10/1964 | Mueller | 296/78.1 |
| 3,561,815 | 2/1971 | Stone | 296/78.1 |

Primary Examiner—Russell R. Kinsey
Attorney—Thomas M. Small

[57] ABSTRACT

A safety shield, for protection of the operator from flying debris, which is fastened to the arms and handles of powered lawn tools such as power lawn edgers and power lawn mowers. The shield is in the form of metal or plastic plates which are fastened to the arms and handles of the equipment. An extension of the shield is set above the handles of the tool in a plane that intersects the imaginary line between the face of the operator and the working area of the powered equipment.

6 Claims, 3 Drawing Figures

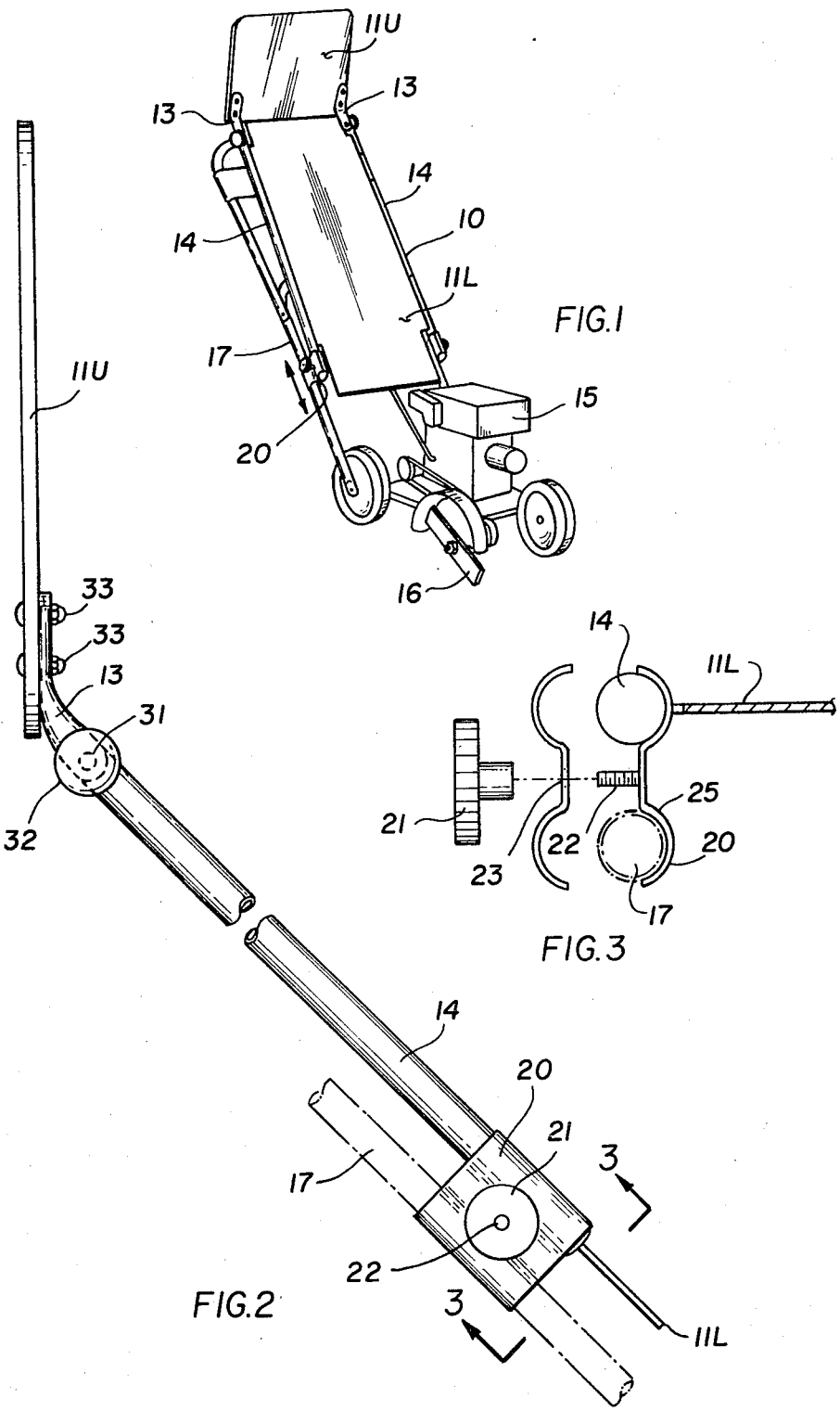

SAFETY SHIELD FOR POWERED LAWN EQUIPMENT

SUMMARY OF THE INVENTION

This invention relates to a means for protecting the user of powered lawn tools, such as power edgers and power mowers, from the flying debris frequently spewed out by such tools.

An advantage of this invention consists of its ready adaptability to most of the powered lawn edgers and powered lawn mowers in use, as well as its simple and lightweight construction.

A particular advantage of the invention lies in the simple manner in which the shield protects the body and face of the operator. It is estimated that the addition of this protective device will effectively reduce numerous serious accidents such as are presently reported by users of powered lawn equipment.

The device consists of a frame, bearing preferably transparent plastic plates. The frame of the device is mounted to the handle arms of the powered lawn equipment. The said frame also includes two projecting members to which is fastened an upper transparent plate above the tool handles. The plane of the upper plate is set at an angle intersecting the imaginary line between the face of the operator of the tool and the working area of the tool blades.

DESCRIPTION OF THE DRAWING

The objects and features of the invention may be understood with reference to the following detailed description of an illustrative embodiment of the invention, taken together with the accompanying drawing in which:

FIG. 1 is a perspective view of the device mounted on a power lawn edger;

FIG. 2 is a partial side view of the mounted device; and

FIG. 3 is an enlarged and exploded cross-section of the device taken at the line 3—3 of FIG. 2.

DESCRIPTION OF THE PREFERRED EMBODIMENT

Turning now descriptively to the drawing, in which similar reference characters denote similar elements throughout the several views, FIG. 1 and FIG. 2 illustrate the device 10 mounted on the handle arm 17 of a powered lawn edger 15. The transparent shields 11L and 11U of the device serve to protect the operator from flying debris thrown out by the rotating lawn edger blade 16.

The frame of the device may be fabricated of tubular frame members 14 which are attached to the handle arms 17 of the powered tool 15 by means of clamps 20.

As shown in FIG. 3, clamp 20 is fastened by screw member 22 and knurled nut 21. Tightening the knurled nut 21 acts to tighten shaped clamp plates 23 and 25 together about both the tubular tool handle arm 17 and the tubular device frame member 14.

Shield plate 11L is mounted to the adjacent frame members 14. Each frame member 14 is pivotably attached at its upper end to a bracket 13 to which shield plate 11U is attached by means of fasteners 33. Shield plate 11U and attached bracket 13 is rotatable about bolt 31, and the assembly is fixed in position by the tightening of knurled nut 32 to screw 31. Shield plate 11U may be set at the optimum angle with respect to the frame members 14 so that the plane of shield member 11U is generally perpendicular to the imaginary line between the blades 16 of the tool 15 and the face of the user.

Shield plates 11L and 11U are of general rectangular shape and may be fabricated of a metal sheet or a transparent plastic plate. Shield plate 11U is preferably fabricated of a transparent plastic plate so that the operator of the power tool 15 will be able to observe the full area of work.

Since obvious changes may be made in the specific embodiment of the invention described herein, it is indicated that all matter contained herein is intended as illustrative and not as limiting in scope.

Having thus described my invention, what I claim as new and desire to secure by Letters Patent of the United States is:

1. In combination with a power lawn edger having a wheeled frame carrying a blade that is rotatable in a generally vertical, front-to-rear plane, and including a handle that is inclined upwardly and rearwardly from said wheeled frame to be gripped by an operator in a predetermined operating position to move the edger along a selected path, a safety shield for the protection of the operator from flying debris from said blades, comprising:

an elongated shield extending along said handle and having an inclined lower portion extending downwardly to adjacent said wheeled frame and also extending upwardly across a first line from the lower portion of the body of the operator to the lower portion of the path of said blade, and having an upper portion positioned on the upper end of said lower portion and extending across a second line from the head of the operator in said predetermined position to the lower portion of the path of the blade;

at least said upper portion being transparent to permit the operator to view said blade along said second line during movement of said edger along said path, and said shield being substantially imperforate between said lines;

and means connected to said lower portion and mounting the shield on the handle of said edger for movement with the latter with said upper and lower portions positioned across said lines, thereby to protect the body and face of the operator from flying debris without interferring with normal operation of the edger.

2. The combination as defined in claim 1 in which said handle comprises at least one upwardly and rearwardly inclined arm, and said means connected to said shield and mounting the latter on said handle include a tubular frame member extending along and connected to one side of said shield, and a clamp connecting said frame member to said arm.

3. The combination as defined in claim 2 in which said handle has a lower end portion comprising two laterally spaced bars connected to said wheeled frame, and said shield has two tubular frame members extending along and connected to opposite sides of the shield, each of said tubular frame members being connected to one of said bars by one of said clamps, adjacent said wheeled frame.

4. The combination as defined in claim 3 in which said clamps are slidable longitudinally of said handle into different selected positions thereon.

5. The combination as defined in claim 1 in which said upper portion and said lower portion are formed as independently movable pieces, and further including hinge means mounting said upper portion on said lower portion for angular adjustment about a generally horizontal angle, whereby said upper portion may be fixed in a position generally at a right angle to said second line.

6. The combination as defined in claim 1 in which said shield is formed as upper and lower independently movable plates, both of which are transparent, said upper portion being formed by one plate and said lower portion by the other, and further including hinge means mounting said one plate on said other plate for angular adjustment relative thereto, said other plate being connected to said handle by means of clamps connected between said other plate and said handle.

* * * * *